United States Patent
Hsiao

(10) Patent No.: US 10,103,968 B2
(45) Date of Patent: Oct. 16, 2018

(54) TREE RECOVERY METHOD, CONTROLLER AND RECORDING MEDIUM FOR SOFTWARE-DEFINED NETWORK

(71) Applicant: Industrial Technology Research Institute, Hsinchu (TW)

(72) Inventor: Tai-Hua Hsiao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 69 days.

(21) Appl. No.: 15/377,997

(22) Filed: Dec. 13, 2016

(65) Prior Publication Data

US 2018/0167306 A1  Jun. 14, 2018

(51) Int. Cl.
| | |
|---|---|
| *H04L 12/751* | (2013.01) |
| *H04L 12/715* | (2013.01) |
| *H04L 12/703* | (2013.01) |
| *H04L 12/707* | (2013.01) |
| *H04L 12/761* | (2013.01) |

(52) U.S. Cl.
CPC .............. *H04L 45/02* (2013.01); *H04L 45/16* (2013.01); *H04L 45/22* (2013.01); *H04L 45/28* (2013.01); *H04L 45/64* (2013.01)

(58) Field of Classification Search
CPC ......... H04L 45/02; H04L 45/16; H04L 45/22; H04L 45/28; H04L 45/64
See application file for complete search history.

(56) References Cited

U.S. PATENT DOCUMENTS

| | | | |
|---|---|---|---|
| 8,811,212 B2 | 8/2014 | Beheshti-Zavareh et al. | |
| 9,300,483 B2 | 3/2016 | Banavalikar et al. | |
| 2011/0286324 A1 | 11/2011 | Bellagamba et al. | |
| 2012/0110393 A1 | 5/2012 | Shieh et al. | |
| 2013/0028073 A1* | 1/2013 | Tatipamula | H04L 41/12 370/218 |
| 2014/0269250 A1 | 9/2014 | Bhikkaji et al. | |

(Continued)

FOREIGN PATENT DOCUMENTS

| | | |
|---|---|---|
| CN | 103428031 | 12/2013 |
| CN | 103457852 | 12/2013 |

(Continued)

OTHER PUBLICATIONS

Furuichi et al., "A Prototype of Network Failure Avoidance Functionality for SAGE Using OpenFlow," IEEE 36th Annual Computer Software and Applications Conference Workshops (COMPSACW), Jul. 16-20, 2012, pp. 88-93.

(Continued)

*Primary Examiner* — Gary Mui
(74) *Attorney, Agent, or Firm* — JCIPRNET

(57) ABSTRACT

A tree recovery method for a software-defined network (SDN) adapted to an SDN controller is provided. The tree recovery method includes: establishing topology information based on a current SDN topology and storing the topology information in a storage of the SDN controller; receiving a failure message reporting a failure link of the SDN, a plurality of network nodes of the topology information are classified into at least one losing nodes and at least one remaining node according to the failure link; and calculating and linking the at least one losing node to the at least one remaining node by using the topology information stored in the storage.

15 Claims, 5 Drawing Sheets

(56) References Cited

U.S. PATENT DOCUMENTS

| | | | |
|---|---|---|---|
| 2014/0269415 A1* | 9/2014 | Banavalikar | H04L 12/185 370/254 |
| 2014/0301192 A1 | 10/2014 | Lee et al. | |
| 2015/0172070 A1 | 6/2015 | Csaszar | |
| 2015/0207671 A1 | 7/2015 | Farkas et al. | |
| 2015/0222446 A1* | 8/2015 | Suresh | H04L 12/185 370/390 |
| 2015/0304158 A1* | 10/2015 | Dharmadhikari | H04L 41/046 714/37 |
| 2015/0326426 A1 | 11/2015 | Luo et al. | |
| 2015/0372898 A1 | 12/2015 | Haramaty et al. | |
| 2015/0372902 A1* | 12/2015 | Giorgetti | H04L 45/64 370/219 |
| 2016/0085641 A1 | 3/2016 | Nagasubramaniam et al. | |
| 2016/0119255 A1 | 4/2016 | Luo et al. | |
| 2016/0197808 A1* | 7/2016 | Popokh | H04L 43/0817 370/248 |
| 2016/0254991 A1* | 9/2016 | Eckert | H04L 12/4633 370/225 |
| 2016/0294734 A1* | 10/2016 | Jang | H04L 41/0654 |
| 2016/0308793 A1 | 10/2016 | Levy-Abegnoli et al. | |
| 2016/0344620 A1* | 11/2016 | G. Santos | H04L 41/0636 |
| 2017/0104622 A1* | 4/2017 | Sawal | H04L 41/046 |
| 2017/0104670 A1* | 4/2017 | Song | H04L 45/38 |
| 2017/0237637 A1* | 8/2017 | Cai | H04L 43/0817 370/253 |
| 2017/0237654 A1* | 8/2017 | Turner | H04L 45/28 370/218 |
| 2017/0279668 A1* | 9/2017 | Shevenell | H04L 41/0677 |
| 2017/0288947 A1* | 10/2017 | Kaniampady Sebastian | H04L 45/22 |
| 2017/0302504 A1* | 10/2017 | Wang | H04L 41/069 |
| 2017/0310588 A1* | 10/2017 | Zuo | H04L 45/74 |
| 2017/0324671 A1* | 11/2017 | Zhang | H04L 47/25 |

FOREIGN PATENT DOCUMENTS

| | | |
|---|---|---|
| CN | 104980302 | 10/2015 |
| CN | 106130895 | 11/2016 |
| CN | 106130905 | 11/2016 |
| WO | 2014131429 | 9/2014 |
| WO | 2016153506 | 9/2016 |

OTHER PUBLICATIONS

Huang et al., "Scalable Steiner Tree for Multicast Communications in Software-Defined Networking," arXiv:1404.3454 [cs.NI], May 8, 2014, pp. 1-8.

Sharma et al., "Enabling fast failure recovery in OpenFlow networks," 8th International Workshop on the Design of Reliable Communication Networks (DRCN), Oct. 10-12, 2011, pp. 164-171.

Beheshti et al., "Fast failover for control traffic in Software-defined Networks," IEEE Conference: Global Communications Conference (GLOBECOM), Dec. 2012, pp. 2665-2670.

Sharma et al., "Fast failure recovery for in-band OpenFlow networks," 9th International Conference on the Design of Reliable Communication Networks (DRCN), Mar. 2013, pp. 52-59.

Yu et al., "OFM: A novel multicast mechanism based on openFlow," Advances in Information Sciences & Service Sciences, May 2012, pp. 278-286.

Nakagawa et al., "A Management Method of IP Multicast in Overlay Networks using OpenFlow," Proceedings of the first workshop on Hot topics in software defined networks(HotSDN), Aug. 13, 2012, pp. 91-96.

Lee et al., "Robust multipath multicast routing algorithms for videos in Software-Defined Networks," IEEE 22nd International Symposium of Quality of Service (IWQoS), May 26-27, 2014, pp. 218-227.

Zou et al., "Design and implementation of secure multicast based on SDN," 5th IEEE International Conference on Broadband Network & Multimedia Technology (IC-BNMT 2013), Nov. 2013, pp. 124-128.

Sgambelluri et al., "OpenFlow-based segment protection in Ethernet networks," IEEE/OSA Journal of Optical Communications and Networking, Sep. 2013, pp. 1066-1075.

Sahri et al., "Fast failover mechanism for software defined networking—OpenFlow based," CFI '14 Proceedings of the Ninth International Conference on Future Internet Technologies, Jun. 18-20, 2014, pp. 1-2.

Kotani et al., "A Design and Implementation of OpenFlow Controller Handling IP Multicast with Fast Tree Switching," IEEE/IPSJ 12th International Symposium on Applications and the Internet (SAINT), Jul. 16-20, 2012, pp. 60-67.

"Office Action of Taiwan Counterpart Application", dated Mar. 14, 2018, p. 1-p. 6, in which the listed references were cited.

\* cited by examiner

TREE RECOVERY METHOD, CONTROLLER AND RECORDING MEDIUM FOR SOFTWARE-DEFINED NETWORK

TECHNICAL FIELD

The present disclosure generally relates to a tree recovery method, and more particularly, to a tree recovery method, a controller and a recording medium for a software-defined network.

BACKGROUND

On the Internet, the video and audio content is, for example, shared to group members through a group manner according to a multicast technique. Generally, the multicast technique shares the aforementioned video and audio content to the group members on a multicast network through a multicast address. An Internet group management protocol (IGMP) is provided to effectively manage and maintain the group member of a multicast group. In detail, under the IGMP, any group member may inform a multicast router before joining or leaving the multicast group.

In these days, a software-defined network (SDN) has been developed. The SDN is a network provided with a technology that converts conventional distributed control and inflexible architectures into centralized control and network programmability architectures. Based on the mechanisms of the SDN, multicasting can be performed in the SDN as well and managed by a SDN controller.

No matter conventional network (e.g., the network structure of IP/Ethernet) or SDN is adopted for multicasting, an effective failure recovery is always an important challenge of the network technology.

SUMMARY

In view of the above, an embodiment of the present disclosure provides a tree recovery method, a controller and a recording medium for a software-defined network (SDN). When a failure occurs in a link/node of the SDN, at least one new link may be determined effectively by the controller using the tree recovery method provided in the embodiment of the present disclosure, such that the losing node may be linked back to the remaining node. Therefore, the transmission quality of the whole network may be maintained in a high level.

An exemplary embodiment of the present disclosure provides a tree recovery method for an SDN adapted to an SDN controller. The tree recovery method includes: establishing topology information based on a current SDN topology and storing the topology information in a storage of the SDN controller; receiving a failure message reporting a failure link of the SDN, a plurality of network nodes of the SDN are classified into at least one losing node and at least one remaining node according to the failure link; and calculating and linking the at least one losing node to the at least one remaining node by using the topology information stored in the storage.

Another exemplary embodiment of the present disclosure provides a controller for an SDN, and the SDN includes a plurality of network nodes. The controller includes a transceiver, a storage and a processor coupled to the transceiver and the storage. The transceiver is configured to communicate with the network nodes. The storage is configured to store topology information recording a current SDN topology. The processor is configured to establish the topology information based on the current SDN topology. The network nodes are classified into at least one losing node and at least one remaining node according to a failure link of the SDN. When the transceiver receives a failure message reporting the failure link of the SDN, the processor further calculates and links the at least one losing node to the at least one remaining node by using the topology information stored in the storage.

Another exemplary embodiment of the present disclosure provides a non-transitory computer readable recording medium stored with a program therein. After the program is loaded into a computer and is executed, the non-transitory computer readable recording medium is capable of completing a tree recovery method for an SDN. The tree recovery method includes: establishing topology information based on a current SDN topology and storing the topology information in a storage of the computer; receiving a failure message reporting a failure link of the SDN, a plurality of network nodes of the SDN are classified into at least one losing node and at least one remaining node according to the failure link of the SDN; and calculating and linking the at least one losing node to the at least one remaining node by using the topology information stored in the storage.

Based on the above, by adopting the tree recovery method and the controller provided in the present disclosure, once a link/node in an SDN environment is disconnected, a new link may be found out by the controller using the topology information stored in the storage of the controller. In this way, the new link on a path with a lowest cost may be found accurately without broadcasting control messages by the network nodes. Accordingly, an effective failure recovery may be completed.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
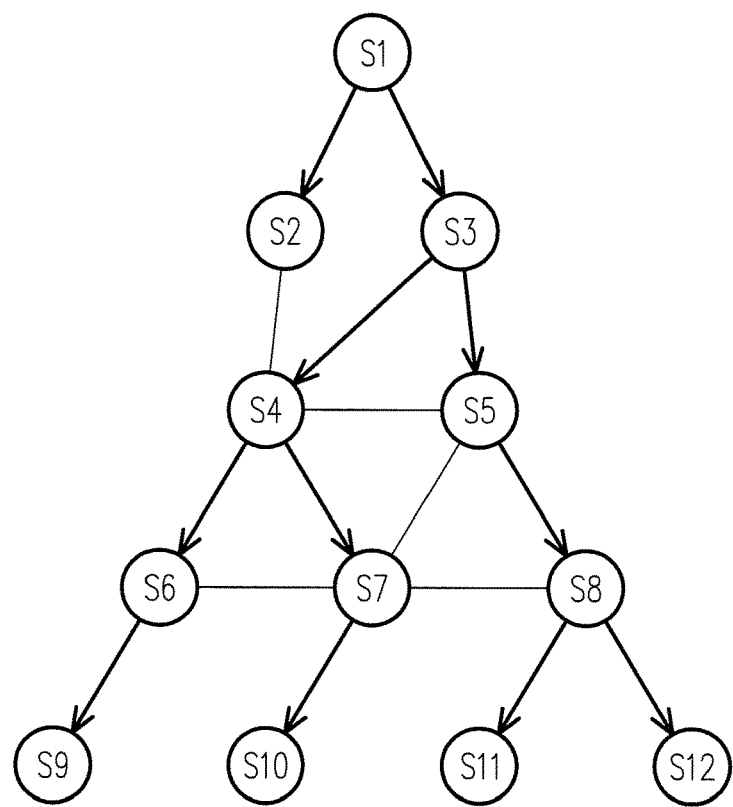
FIG. 1 is a schematic diagram illustrating a current SDN topology according to an embodiment of the present disclosure.

Reference will now be made in detail to the present preferred embodiments of the invention, examples of which are illustrated in the accompanying drawings. Wherever possible, the same reference numbers are used in the drawings and the description to refer to the same or like parts.

In the SDN of the present disclosure, topology information reflecting the current SDN topology is stored in a storage of the SDN controller. Once a specific link/node of the SDN fails, some nodes (referred as losing nodes) of the SDN may lose and may not receive data from a multicasting root node anymore. By adopting the tree recovery method provided in the present disclosure, at least one new link for reconnect the losing nodes to the remaining node may be calculated by the SDN controller using the topology information stored in the storage thereof. The SDN controller may further notifies those nodes needed to modify settings according to the calculation result. As such, the SDN may be recovered with high efficiency by adopting the techniques of the present disclosure.

FIG. 1 is a schematic diagram illustrating a current SDN topology according to an embodiment of the present disclosure.

In an embodiment of the present disclosure, the SDN of the embodiment includes multiple network nodes S1 to S12 (also referred as nodes S1 to S12 throughout the description). In the embodiment, the nodes S1 to S12 may be, for example, OpenFlow switches, and form a multicasting tree. The node S1 acts as a root node which forwards data (e.g., broadcast content) to multicasting leaf nodes S9 to S12. On the other hand, the nodes S1 to S12 act as switches or routers which are responsible for forwarding the data to the receiver. People having ordinary skills in the art should have understood the related knowledges of the SDN, the multicasting tree and the nodes therein, therefore which are not repeated herein.

Referring to FIG. 1, not only the nodes S1 to S12 of the SDN, the paternity relationship and the neighbour information of each node S1 to S12 are also included in the current SDN topology CT1. Taking the node S4 as an example, the paternity relationship shows that the node S4 receives data from the node S3, and forwards the data to the nodes S6 and S7 (presented by the arrows). Besides, the neighbour information shows that the node S4 is linkable to the nodes S2 and S5 (presented by the solid lines connecting between two nodes). Therefore, the current SDN topology CT1 includes the multicasting tree of the present embodiment.

It should be noted that the nodes S1 to S12 of the SDN form a multicasting tree in the present embodiment, but which is not limited thereto. Data flows between the nodes of the SDN are not limited in the present disclosure.

Figure 2:
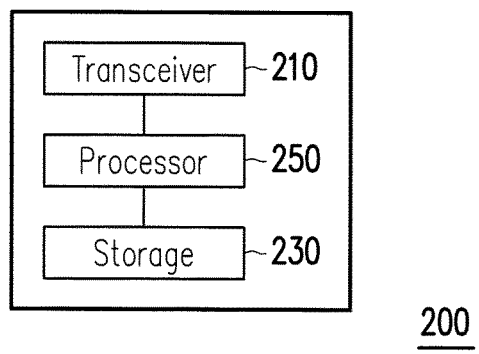
FIG. 2 is a block diagram illustrating an SDN controller according to an embodiment of the present disclosure.

FIG. 2 is a block diagram illustrating an SDN controller according to an embodiment of the present disclosure. In general, a controller may be provided in the SDN as a commander, for communicating with the nodes of the SDN and managing the behaviour and configuration of each node. For example, the controller may decide the SDN topology including the paternity relationship and the neighbour information of each node, so that the SDN topology becomes a multicasting tree. The controller may further evaluate the proper neighbour node of losing nodes arise from path failure of the SDN, so that the losing nodes could be reconnected to the remaining nodes for regaining data therefrom. However, the capability of the controller is not limited herein. In the embodiment, the provided controller may be implement as the SDN controller 200 shown in FIG. 2. The SDN controller 200 is provided for communicating with the nodes S1 to S12 of the SDN and managing the behaviour and configuration of each node S1 to S12.

Referring to FIG. 2, the SDN controller 200 includes a transceiver 210, a storage 230 and a processor 250. The transceiver 210 is configured to communicate with the nodes S1 to S12, for example, by adopting OpenFlow1.3, OpenFlow1.4, OpenFlow1.5 or other SDN communication technologies, which is not limited in the disclosure.

In the embodiment of the present disclosure, the processor 250 may establish topology information base on the current SDN topology CT1 and store the topology information in the storage 230. By using the topology information stored in the storage 230, the processor 250 may perform the tree recovery method provided in the present disclosure.

The topology information records a receiving path for each node S1 to S12. In the embodiment, the receiving path is a path through which the root node S1 links to the corresponding node. Optionally, the topology information further records the paternity relationship and the neighbour information for each node S1 to S12 (e.g., establishing a children table for each node S1 to S12 to record the nodes receiving multicasting data transmitted from the corresponding node, and establishing a neighbour table for each node S1 to S12 to record the nodes having physical link to the corresponding node but no multicasting data transmitted thereto and therefrom), but which is not limited in the present disclosure.

Figure 3:
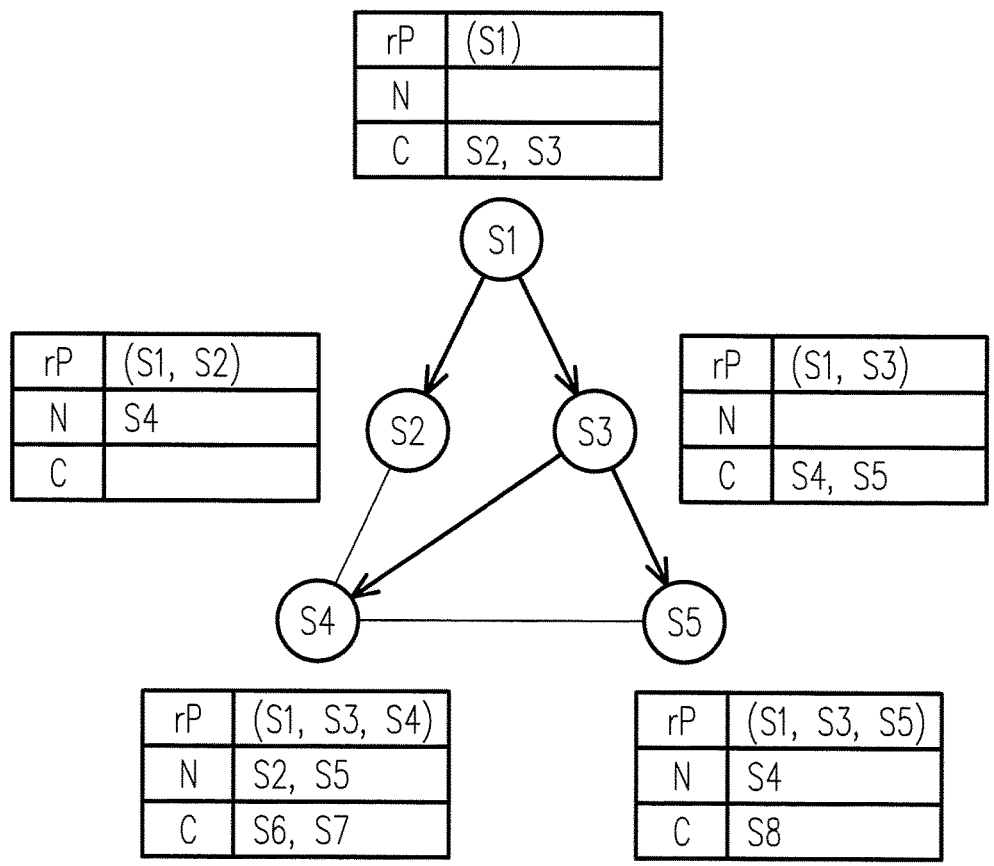
FIG. 3 is a schematic diagram illustrating topology information according to an embodiment of the present disclosure.

FIG. 3 is a schematic diagram illustrating topology information according to an embodiment of the present disclosure. Only part of the topology information of the present embodiment is presented in FIG. 3 for convenience of description.

According to the current SDN topology CT1 of FIG. 1, for example, the receiving path of the node S2 is (S1, S2), which indicates that data is hopping from the root node S1 to the node S2. For another example, the receiving path of the node S4 is (S1, S3, S4), which indicates that data is hopping from the root node S1 to the node S4 through the node S3. Based on the current SDN topology CT1, the receiving path of each node S1 to S5 may be recorded in the topology information as shown in FIG. 3. In the present embodiment, the receiving path of other nodes S6 to S12 may be recorded in the topology information through a similar way mentioned above.

According to the current SDN topology CT1 of FIG. 1, for example, the node S2 is linkable to the node S4, but the node S2 does not forward data thereto. For another example, the node S3 is linkable to the nodes S4 and S5, and the node S3 does forward data to the nodes S4 and S5 in the multicasting tree. For still another example, the node S4 is linkable to the nodes S2, S3, S5, S6 and S7, and the node S4 forwards data to the nodes S6 and S7. Based on the current SDN topology CT1, as shown in FIG. 3, the node S4 is recorded as a neighbour node of the node S2, the nodes S4 and S5 are recorded as the child nodes of the node S3, the nodes S2 and S5 are recorded as the neighbour nodes of the node S4, and the nodes S6 and S7 are recorded as the child nodes of the node S4 in the topology information. Accordingly, the paternity relationship and the neighbour information of each node S1 to S5 may be also recorded in the topology information as shown in FIG. 3. In the present embodiment, the paternity relationship and the neighbour information of other nodes S6 to S12 may be recorded in the topology information through a similar way mentioned above.

It should be noted that, in the embodiment, a parent node of a specific node is implied in the information of the receiving path of the specific node. Therefore, the parent node is not required to be specified in the paternity relationship. In the present embodiment, only one or more child nodes are specified in the paternity relationship. However, the detail recoded in the topology information is not limited in the present disclosure. Based on the embodiment, people having ordinary skills in the art may appropriately make modifications according to different situations as long as the topology information reflects the current SDN topology.

In one embodiment, the processor 250 may update the topology information stored in the storage 230 in real-time such that the topology information stored in the storage 230 may reflect the current SDN topology. For example, once the transceiver 210 receives a message reporting a new node is joining the multicasting tree to receive the data from the root node S1, the processor 250 may update the topology information stored in the storage 230 according to the received message. Similarly, once the transceiver 210 receives a message reporting a node is leaving the multicasting tree, the processor 250 may also update the topology information stored in the storage 230 according to the received message.

Figure 4:
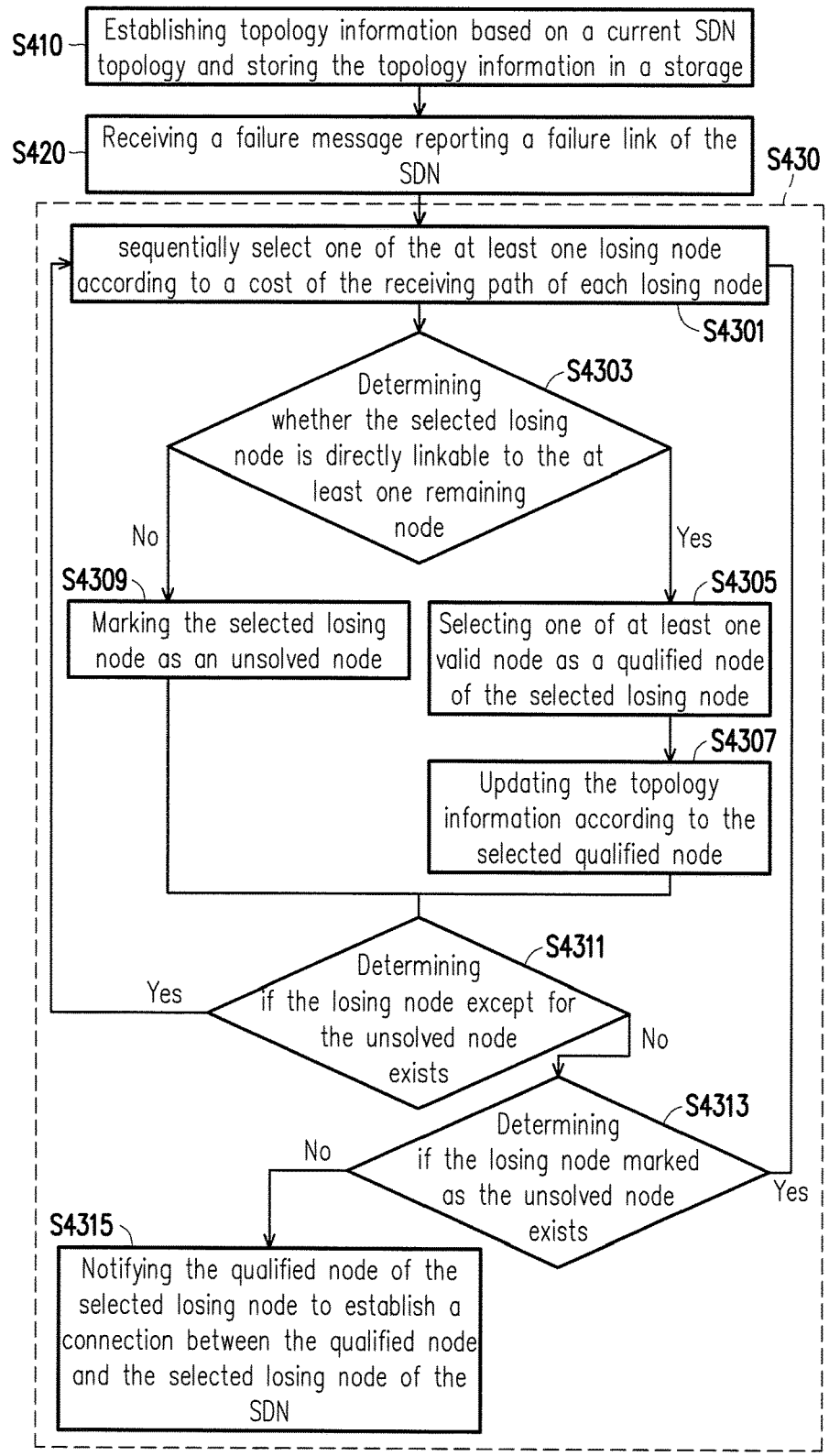
FIG. 4 is a flow chart illustrating a tree recovery method according to an embodiment of the present disclosure.
Figure 5:
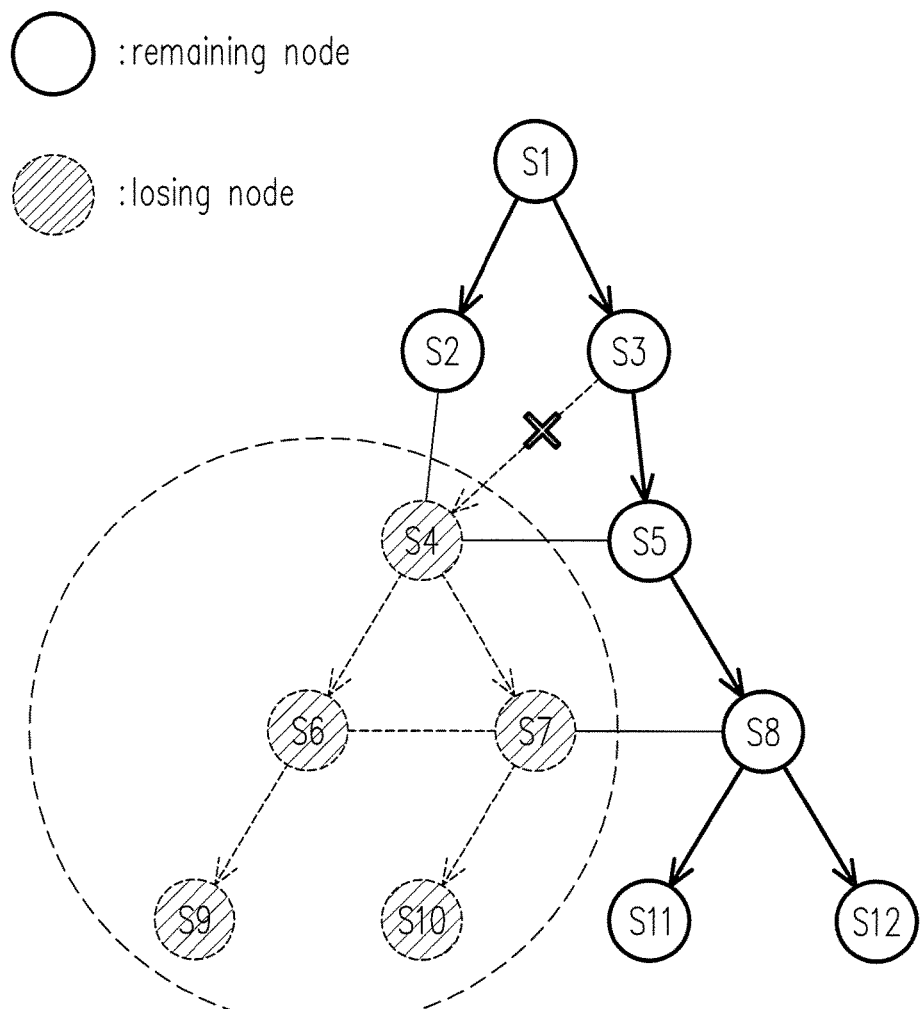
FIG. 5 is a schematic diagram illustrating a current SDN topology according to an embodiment of the present disclosure.

FIG. 4 is a flow chart illustrating a tree recovery method according to an embodiment of the present disclosure, and FIG. 5 is a schematic diagram illustrating a current SDN topology according to an embodiment of the present disclosure. The current SDN topology CT2 of FIG. 5 is similar to which of FIG. 1, whereas the link between the node S3 and the node S4 is disconnected. The tree recovery method may be performed by the SDN controller 200 of FIG. 2 for recovery in the embodiment of the present disclosure.

Before the link between the node S3 and the node S4 is disconnected, the current SDN topology CT1 is presented in FIG. 1. In step S410, the processor 250 may establish the topology information based on the current SDN topology CT1 and store the established topology information in the storage 230. In the embodiment, for example, the processor 250 may record a receiving path for each node S1 to S12 in the topology information. Details of step S410 are described in the embodiment of FIG. 1 to FIG. 3, therefore which are not repeated herein.

At this time, the topology information established in step S410 is storing in the storage 230. In the present embodiment, the link between the node S3 and the node S4 incidentally disconnects, and the current SDN topology CT1 turns into the current SDN topology CT2 presented in FIG. 5. In step S420, the processor 250 may receive a failure message reporting a failure link of the SDN through the transceiver 210. In the embodiment, the failure link may indicate the link down between the node S3 and the node S4 and the failure message may be a link-down message reporting the failure link. It is noted that a failure link between two specific nodes may be caused by various reasons, which is not limited in the present embodiment. For example, traffic overloading may cause the link between the two specific nodes fails. For another example, the link may also fail if at least one of the two specific nodes malfunctions.

In one embodiment of the present disclosure, the processor 250 further stores the failure link in the storage 230, but which is not limited thereto. Besides, it is noted that a source of the failure message is not limited herein, the failure message may come from any source that the transceiver 230 could reach.

Once the processor 250 receives the failure message, the processor 250 may retrieve the topology information stored in the storage 230. According to the failure link, the nodes S1 to S12 may be classified into at least one losing node and at least one remaining node. In the embodiment, the nodes S4, S6, S7, S9 and S10 are the losing nodes, which cannot receive the data from the root node S1 and thus losing in the multicasting tree due to the failure link. On the other hand, the nodes S1 to S3, S5, S8, S11 and S12 are the remaining nodes, which are still in the multicasting tree and capable of receiving the data from the root node S1.

It is noted that the nodes S1 to S12 may be classified by referring the receiving path of each node S1 to S12 recorded in the topology information stored in the storage 230. In the embodiment, the path (S1, S3, S4) may fail due to the link down between the node S3 and S4, therefore a certain node may be determined by the processor 250 as a losing node if the prefix path of the receiving path of the certain node is identical to the failed path (S1, S3, S4), and vice versa.

For example, the receiving path of the node S6 is (S1, S3, S4, S6), therefore the node S6 is determined as a losing node since the prefix path of the receiving path (S1, S3, S4, S6) is identical to the failed path (S1, S3, S4). For another example, the receiving path of the node S8 is (S1, S3, S5, S8), therefore the node S8 is determined as a remaining node since the prefix path of the receiving path (S1, S3, S5, S8) is different from the failed path (S1, S3, S4). However, the classification method is not limited in the embodiment.

For reconnecting the losing nodes to the multicasting tree, in step S430, by using the topology information stored in the storage 230, the processor 250 may calculate and link the at least one losing node to the at least one remaining node. In the present embodiment, the step S430 includes the steps S4301 to S4315.

In step S4301, the processor 250 may sequentially select one of the at least one losing node S4, S6, S7, S9 and S10 according to a cost of the receiving path of each losing node S4, S6, S7, S9 and S10. In the embodiment, the losing node having the receiving path with a lower cost may be selected prior to the losing node having the receiving path with a higher cost.

In the present embodiment, cost of a path may be determined by hops of the path. In other embodiments, cost of a path may be determined according to a link-state on the path instead, where the link-state may be affected by bandwidth, traffic load, latency or other factors of the path. Briefly, way of determining cost of a path is not limited in the present disclosure.

It is noted that the hops of each node may be determined by referring the receiving path of the corresponding node as well. In the embodiment, from the root node S1, the hops of the losing node S4 is 2, the hops of the losing nodes S6 and S7 is 3, and the hops of the losing nodes S9 and S10 is 4. As a result, the node S4 may be first selected in the embodiment.

In step S4303, the processor 250 may determine whether the selected losing node S4 is directly linkable to at least one of the remaining nodes S1, S2, S3, S5, S8, S11 and S12. If the processor determines that the selected losing node S4 is directly linkable to at least one of the remaining nodes S2, S5 according its neighbour information, step S4305 is entered to reconnect the selected node S4 to the multicasting tree. Otherwise, step S4309 is entered to mark the selected losing node as an unsolved node.

Regarding the selected losing node S4, it may be known from the topology information that the losing node S4 has two linkable nodes S2 and S5 and these two nodes S2 and S5 are remaining nodes. In detail, the root of the receiving paths of the nodes S2 and S5 is same as that of the node S4, which means that these nodes S2, S4 and S5 are belonging to same multicasting tree. Nevertheless, the prefix path of the receiving paths of the nodes S2 and S5 are different from the failed path (S1, S3, S4) while the node S4 is the root of losing tree (nodes), therefore the nodes S2 and S5 are remaining nodes. In the embodiment, the remaining nodes S2 and S5 directly linkable to the selected losing node S4 are referred as valid nodes of the selected losing node S4. Therefore, in step S4305, the processor 250 may select one of the valid nodes S2 and S5 with a lowest cost as a qualified node, being a new parent node of the selected losing node S4. In the embodiment, the hops of a node from the root node S1 may be determined according to receiving path of the node, such that the hops of the valid node S2 is 1, and the hops of the valid node S5 is 2. Moreover, the hops of the node S2 is equal to the ex-parent of the node S4 (i.e., the node S3) while the ex-parent of the node S4 has a lowest cost to reach the node S4 in the original multicasting tree before the link between the node S3 and S4 disconnects. Therefore, the node S2 is an optimal node with the same lowest cost within the current remaining nodes could be selected. The processor 250 may select the valid node S2 as the qualified node of the node S4 in the embodiment. The selected qualified node S2 may be configured to forward the data from the root node S1 to the losing node S4.

After the qualified node is selected, in step S4307, the processor 250 may update the topology information stored in the storage 230 according to the selected qualified node S2. In this way, the selected losing node S4 may be connected to the qualified node S2 in the updated topology information. In the embodiment, the processor 250 may update the child node of the qualified node S2 and the remaining node S3, update the receiving path of each losing node S4, S6, S7, S9 and S10. For example, the processor 250 may record the node S4 as a child node of the qualified node S2, and delete the node S4 from the child node of the node S3. In addition, the receiving path with the prefix path of (S1, S3, S4) may be updated. For another example, the receiving path of the node S4 may be updated to (S1, S2, S4), the receiving path of the node S6 may be updated to (S1, S2, S4, S6), the receiving path of the node S7 may be updated to (S1, S2, S4, S7), the receiving path of the node S9 may be updated to (S1, S2, S4, S6, S9), and the receiving path of the node S10 may be updated to (S1, S2, S4, S7, S10).

According to the updated topology information, the classification of the nodes S1 to S12 may not same as before according to the receiving path of each node S1 to S12. In the present embodiment, after connecting the node S4 to the qualified node S2, the nodes S4, S6, S7, S9 and S10 are capable of receiving the data from the root node S1 again. Therefore, the nodes S4, S6, S7, S9 and S10 are no longer losing nodes and may be determined by the processor 250 as remaining nodes instead.

In step S4311, the processor 250 may determine if the losing node except for the unsolved node exists according to the updated topology information. If no losing node exists except for the unsolved node, step S4313 is entered. Otherwise, step S4301 is entered again to select another losing node according to the cost of the receiving path of each losing node. In the present embodiment, the nodes S4, S6, S7, S9 and S10 may be determined as remaining nodes, therefore no losing node remains.

In step S4313, the processor 250 may determine if the losing node marked as the unsolved node exists. If the losing node marked as the unsolved node exists, step S4301 may be entered to rescue the unsolved node. Otherwise, step S4315 is entered to notify the node of the SDN needed to modify flow table thereof. In the embodiment, no losing node has been marked as the unsolved node in step S4309, therefore step S4315 may be entered.

In step S4315, the processor 250 may notify the qualified node S2 to establish a connection between the qualified node S2 and the selected losing node S4 by using the transceiver 210. In detail, the processor 250 may notify the qualified node S2 to add a new flow entry into the flow table thereof, such that the node S4 is added as a new child node of the qualified node S2 and the multicasting data could be forward to the node S4 by the qualified node S2. To be specific, when a new child node has been added to a certain node in the topology information, the certain node in the SDN is required to be notified. After being notified, the specific node may modify the flow table so as to forward data to the new child node. In the embodiment, only the qualified node S2 in the SDN is required to be notified to modify the flow table thereof, so as to establish a connection with the node S2 to forward data to the node S4 in the SDN. After the qualified node S2 in the SDN is notified, the data from the root node S1 may be again transmitted to all the nodes S2 to S12, hence the multicasting tree is recovered in the embodiment.

It is noted that in the embodiment presented above, once the SDN controller 200 receives the failure message of the link between the node S3 and the node S4, only the node S2 is required to receive notification to add a new child node S4. Hence, the control messages transmitted between the SDN controller 200 and the network nodes S1 to S12 may be minimized as much as possible. In addition, the nodes of the SDN do not have to broadcast control messages to find the new path in the embodiment. Accordingly, an effective failure recovery may be completed.

Figure 6:
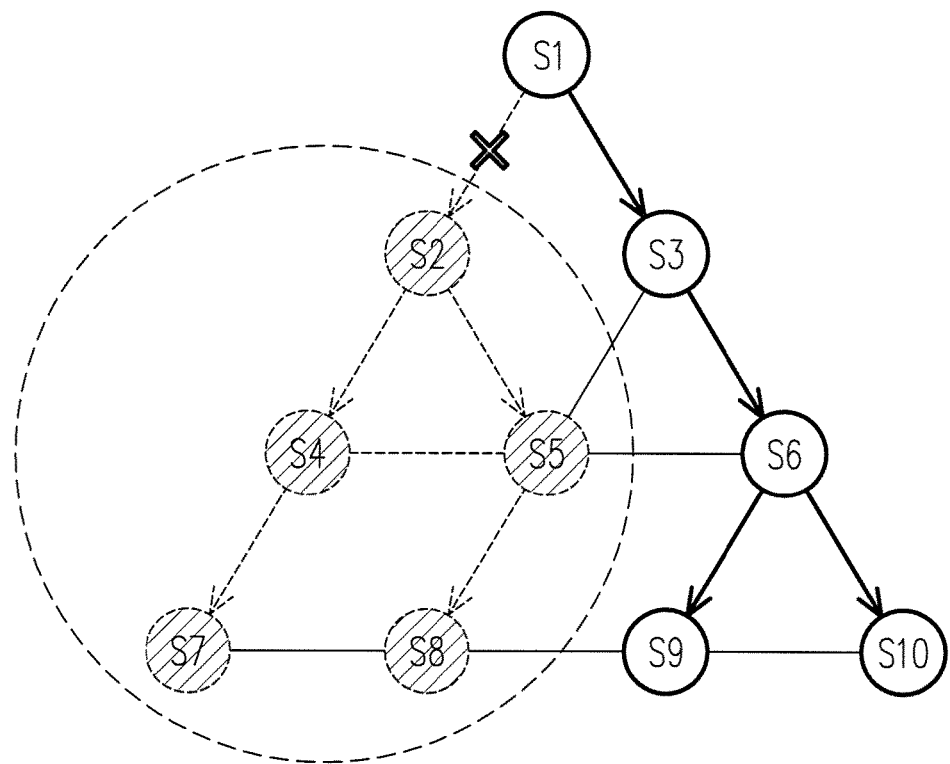
FIG. 6 is a schematic diagram illustrating a current SDN topology according to an embodiment of the present disclosure.

FIG. 6 is a schematic diagram illustrating a current SDN topology according to an embodiment of the present disclosure. Similar to the embodiment of FIG. 5, an SDN of the present embodiment of FIG. 6 includes multiple network nodes S1 to S10 and thus forms a multicasting tree. Originally, data may be transmitted from the root node S1 to the other nodes S2 to S10. Once the link down between the node S1 and the node S2 occurs, the current SDN topology is shown in FIG. 6. In the present embodiment, the nodes S2, S4, S5, S7 and S8 may lose in the multicasting tree and being unable to receive the data from the root node S1. The SDN controller 200 may perform the tree recovery method introduced in the embodiment of FIG. 4 to reconnect the losing nodes S2, S4, S5, S7 and S8 to the multicasting tree. In the present embodiment, details of the steps of FIG. 4 which have been described before are not repeated herein.

Referring to FIG. 2, FIG. 4, and FIG. 6, in step S410, topology information is established by the processor 250 and stored in the storage 230, where the established topology information reflects the current SDN topology before the link down between the node S1 and the node S2 occurs. After the link down between the node S1 and the node S2 occurs, the processor 250 may receive a failure message reporting a failure link of the SDN through the transceiver 210 in step S420. Similar to the embodiment of FIG. 5, the failed path is recorded as (S1, S2), the nodes S1 to S10 are also classified into the losing nodes S2, S4, S5, S7 and S8 and the remaining nodes S1, S3, S6, S9 and S10 according to the receiving path of each node.

According to the cost of the receiving path of each losing nodes S2, S4, S5, S7 and S8 recorded in the topology information, in step S4301, the processor 250 may select the losing node S2 first. In step S4303, the processor 250 may determine that the selected losing node S2 is not directly linkable to any remaining node. As a result, the losing node S2 may be marked as an unsolved node in step S4309. In step S4311, except for the losing node S2 marked as the unsolved node, the processor 250 may determine that there are still losing nodes S4, S5, S7 and S8 exist, therefore the processor 250 may select one of the losing nodes S4, S5, S7 and S8 in step S4301.

In the present embodiment, the hops of the losing node S4 from the root node S1 is 2, and the hops of the losing node S5 from the root node S1 is also 2. Therefore, the processor 250 may select one of the losing node S4 and S5 according to the design requirements, which is not limited in the embodiment. In the present embodiment, the processor 250 may select the losing node S4 first. Similar to the last selected losing node S2, the losing node S4 is not directly linkable to any remaining node, because the only neighbour node of node S4 is the node S5, and the node S5 is still determined as a losing node according to the prefix path of the receiving path of the node S5. Therefore, the losing node S4 is also marked as an unsolved node. In step S4311, except for the losing nodes S2 and S4 marked as the unsolved nodes, the processor 250 may determine that there are still losing nodes S5, S7 and S8 exist, therefore the processor 250 may select one of the losing nodes S5, S7 and S8 in step S4301.

According to the cost of the receiving path of each losing node S5, S7 and S8, the losing node S5 may be selected by the processor 250 in step S4301. In step S4303, the processor 250 may determine that the losing node S5 is directly linkable to the remaining nodes S3 and S6 (also referred as the valid nodes of the losing node S5). In step S4305, the processor 250 may select the valid node S3 as a qualified node in the embodiment, since the cost of the receiving path of the remaining node S3 is lower than that of the remaining (valid) node S6.

In step S4307, the processor 250 may update the topology information stored in the storage 230 according to the selected qualified node S3. For example, the receiving path with the prefix path of (S1, S2, S5) may be updated. In the embodiment, the receiving path of the node S5 may be updated to (S1, S3, S5), and the receiving path of the node S8 may be updated to (S1, S3, S5, S8). Besides, the paternity relationships of the nodes S3, S5 and S8 may be updated correspondingly.

After the topology information is updated, the classification of the nodes S1 to S10 may not same as before according to the receiving path of each node S1 to S10. In the embodiment, the nodes S2, S4 and S7 may be determined as the losing nodes and the nodes S5 and S8 may be determined as the remaining nodes by the processor 250.

In step S4311, except for the losing nodes S2 and S4 marked as the unsolved nodes, the processor 250 may determine that there are still losing node S7 exist, therefore the processor 250 may select the losing node S7 in step S4301. In a similar way, the remaining node S8 may be selected as the qualified node of the node S7, the topology information may be updated, the nodes S2 and S4 may be determined as the losing nodes, and the node S7 may be determined as the remaining node.

In step S4311, except for the losing nodes S2 and S4 marked as the unsolved nodes, the processor 250 may determine that there is no losing node remains and thus step S4313 is entered. In step S4313, the processor 250 may determine that there are two losing nodes S2 and S4 marked as the unsolved nodes in the embodiment, then step S4301 is entered again to rescue the unsolved nodes S2 and S4. In S4301, the processor 250 may sequentially select one of the losing nodes S2 and S4 according to the cost of the receiving path of each losing node S2 and S4. In the embodiment, the losing node S2 is first selected.

In the similar way, the remaining node S5 may be selected as the qualified node of the losing node S2, the topology information may be updated, then the node S4 may be determined as the losing node, and the node S2 may be determined as the remaining node.

In step S4311, except for the losing node S4 marked as the unsolved nodes, the processor 250 may determine that there is no losing node remains. In step S4313, the processor 250 may determine that there is one unsolved node S4 in the embodiment, then step S4301 is entered again to rescue the unsolved node S4. The losing node S4 is selected in step S4301.

In the similar way, the remaining node S5 may be selected as the qualified node of the losing node S4, the topology information may be updated, then the node S4 may be determined as the remaining node.

Then, no losing node remains and step S4315 is entered. In step S4315, the processor 250 may notify the qualified node S3 to establish a connection with the node S5, notify the qualified node S5 to establish a connection with the nodes S2, S4 and S8, notify the qualified node S8 to establish a connection with the node S7 by using the transceiver 210. As a result, the multicasting tree is recovered in the embodiment.

In summary, by adopting the tree recovery method and the controller provided in the present disclosure, once a link down in an SDN environment occurs, a new link may be found out by the controller using the topology information stored in the storage of the controller. In addition, only the network node required to change the configuration or to modify the flow table is notified by the controller. Hence, the packets transmitted between the controller and the network nodes may be minimized as much as possible. Moreover, the new link on a path with a lowest cost may be found accurately without broadcasting control messages by the network nodes. Accordingly, an effective failure recovery may be completed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A tree recovery method for a software-defined network (SDN), adapted to an SDN controller, the tree recovery method comprising:
    establishing topology information based on a current SDN topology and storing the topology information in a storage of the SDN controller, comprising:
    recording a receiving path for each of a plurality of network nodes in the topology information, wherein the current SDN topology comprises a multicasting tree and the topology information records the multicasting tree, wherein the multicasting tree comprises a root node, and the root node transmits data to the corresponding network node through the receiving path in the multicasting tree;
    receiving a failure message reporting a failure link of the SDN, wherein the plurality of network nodes of the topology information are classified into at least one losing node and at least one remaining node according to the failure link; and
    calculating and linking the at least one losing node to the at least one remaining node by using the topology information stored in the storage, comprising:
    sequentially selecting one of the at least one losing node according to a cost of the receiving path of each losing node; and if the selected losing node is directly linkable to the at least one remaining node, linking the selected losing node to one of the at least one remaining node in the topology information.

2. The tree recovery method as claimed in claim 1, wherein the losing node having the receiving path with a lower cost is selected prior to the losing node having the receiving path with a higher cost.

3. The tree recovery method as claimed in claim 1, wherein the step of linking the selected losing node to one of the at least one remaining node in the topology information comprises:
selecting one of at least one valid node as a qualified node of the selected losing node, wherein the at least one valid node is the at least one remaining node directly linkable to the selected losing node.

4. The tree recovery method as claimed in claim 3, wherein the step of selecting the qualified node comprises:
selecting the valid node having the receiving path with a lowest cost as the qualified node.

5. The tree recovery method as claimed in claim 3, further comprising:
notifying the qualified node of the selected losing node to establish a connection between the qualified node and the selected losing node of the SDN.

6. The tree recovery method as claimed in claim 3, further comprising:
updating the topology information stored in the storage.

7. The tree recovery method as claimed in claim 1, wherein if the selected losing node is not directly linkable to any remaining node, marking the selected losing node as an unsolved node, wherein after the step of linking the selected losing node to one of the at least one remaining node in the topology information, further comprises:
determining whether the losing node marked as the unsolved node exists; and
if the losing node marked as the unsolved node exists, calculating and linking the unsolved node to the at least one remaining node by using the topology information stored in the storage.

8. A controller for a software defined network (SDN), wherein the SDN comprises a plurality of network nodes, and the controller comprises:
a transceiver configured to communicate with the network nodes;
a storage configured to store topology information recording a current SDN topology, wherein the current SDN topology includes a multicasting tree and the topology information records the multicasting tree, wherein the multicasting tree includes a root node; and
a processor coupled to the transceiver and the storage, configured to establish the topology information based on the current SDN topology, wherein the topology information records a receiving path for each of the plurality of network nodes, wherein the root node transmits data to the corresponding network node through the receiving path in the multicasting tree,
wherein the network nodes are classified into at least one losing node and at least one remaining node according to a failure link of the SDN,
wherein when the transceiver receives a failure message reporting the failure link of the SDN, the processor further calculates and links the at least one losing node to the at least one remaining node by using the topology information stored in the storage,
wherein when the processor calculates and links the at least one losing node to the at least one remaining node, the processor sequentially selects one of the at least one losing node according to a cost of the receiving path of each losing node, and determines whether the selected losing node is directly linkable to the at least one remaining node, wherein if the selected losing node is directly linkable to the at least one remaining node, the processor links the selected losing node to one of the at least one remaining node in the topology information.

9. The controller as claimed in claim 8, wherein the processor selects the losing node having the receiving path with a lower cost prior to the losing node having the receiving path with a higher cost.

10. The controller as claimed in claim 8, wherein the processor further selects one of at least one valid node as a qualified node of the selected losing node if the selected losing node is directly linkable to the at least one remaining node, wherein the at least one valid node is the at least one remaining node directly linkable to the selected losing node.

11. The controller as claimed in claim 10, wherein in the at least one valid node, the selected qualified node has the receiving path with a lowest cost.

12. The controller as claimed in claim 10, wherein the transceiver is further configured to notify the qualified node of the selected losing node to establish a connection between the qualified node and the selected losing node of the SDN.

13. The controller as claimed in claim 10, wherein the processor further updates the topology information stored in the storage.

14. The controller as claimed in claim 8, wherein if the selected losing node is not directly linkable to any remaining node, the processor marks the selected losing node as an unsolved node,
wherein after linking the selected losing node to one of the at least one remaining node in the topology information, the processor further calculates and links the unsolved node to the at least one remaining node by using the topology information stored in the storage if the unsolved node exists.

15. A non-transitory computer readable recording medium, stored with a program therein, and capable of completing the tree recovery method of claim 1 after the program is loaded into a computer and is executed.

* * * * *